(12) United States Patent
Sato

(10) Patent No.: US 8,418,224 B2
(45) Date of Patent: Apr. 9, 2013

(54) INFORMATION PROCESSING APPARATUS, INFORMATION PROCESSING METHOD, AND PROGRAM

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1402 days.

(21) Appl. No.: 11/462,141

(22) Filed: Aug. 3, 2006

(65) Prior Publication Data

US 2007/0041045 A1    Feb. 22, 2007

(30) Foreign Application Priority Data

Aug. 5, 2005    (JP) ................................. 2005-228473

(51) Int. Cl.
 *H04L 29/06* (2006.01)
(52) U.S. Cl. ............ 726/2; 713/150; 713/168; 713/169; 713/170; 713/185
(58) Field of Classification Search .................. 713/168; 726/2
 See application file for complete search history.

(56) References Cited

U.S. PATENT DOCUMENTS

| 5,363,507 | A | * | 11/1994 | Nakayama et al. | ........... 715/743 |
| 5,922,073 | A | * | 7/1999 | Shimada | ........................ 726/6 |
| 6,317,823 | B1 | | 11/2001 | Wakai et al. | ................... 712/220 |
| 7,114,075 | B1 | * | 9/2006 | Yasuda et al. | ................. 713/182 |
| 7,313,699 | B2 | * | 12/2007 | Koga | ............................. 713/170 |
| 2003/0009695 | A1 | * | 1/2003 | Sato | .............. 713/201 |
| 2003/0065952 | A1 | | 4/2003 | Otsuka | |
| 2006/0168529 | A1 | * | 7/2006 | Rokosz et al. | ................ 715/751 |
| 2006/0173722 | A1 | * | 8/2006 | Mizutani | ........................... 705/8 |

FOREIGN PATENT DOCUMENTS

| EP | 0 853 273 | | 7/1998 |
| JP | 10-240550 | | 9/1998 |
| JP | 11-103367 | A | 4/1999 |
| JP | 2003-110551 | A | 4/2003 |
| JP | 2004-015326 | A | 1/2004 |
| JP | 2004-248303 | A | 9/2004 |

OTHER PUBLICATIONS

Chung, Edward, and M. Celenk. "PC-Based Digital Facsimile Information Distribution System." Department of Electrical and Computer Engineering, Ohio University, Stocker Center, Athens, Ohio. IEEE 1992.*
The above references were cited in a May 10, 2010 Japanese Office Action, which is enclosed with an English Translation, that issued in Japanese Patent Application No. 2005-228473.

* cited by examiner

*Primary Examiner* — Taghi Arani
*Assistant Examiner* — Narciso Victoria
(74) *Attorney, Agent, or Firm* — Cowan, Liebowitz & Latman, P.C.

(57) ABSTRACT

Disclosed is a technique which aims to suitably limit access to stored information from an external apparatus which is not permitted to access the information. An information processing apparatus such as an MFP authenticates a portable information terminal, and stores information input within a predetermined period after the authentication in association with the portable information terminal. When accepting a request for processing the stored information from a portable information apparatus after the predetermined period, the information processing apparatus identifies whether the portable information terminal having transmitted the request is the device associated with the information of interest. If the portable information terminal is identified as the device associated with the stored information, the information processing apparatus executes the processing of the information in accordance with the request.

12 Claims, 16 Drawing Sheets

FIG. 6

PLEASE LOG IN FROM PORTABLE
INFORMATION TERMINAL

F I G. 12
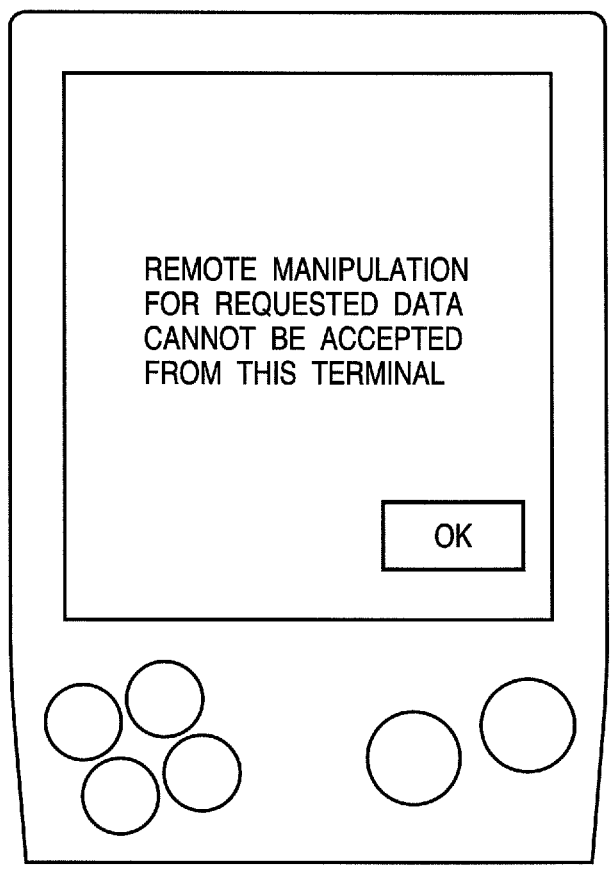

INFORMATION PROCESSING APPARATUS, INFORMATION PROCESSING METHOD, AND PROGRAM

BACKGROUND OF THE INVENTION

1. Field of the Invention

The present invention relates to an information processing apparatus, information processing method, and program which detect an external apparatus and execute processing.

2. Description of the Related Art

Recently, many information processing apparatuses are connected to networks and can be used and managed from remote places across networks. For example, printers and digital multi-functional peripherals (MFPs) of CANON incorporated, a Web server and a Web application called "REMOTE UI" allows Web browsers to connect to the Web server and use or manage the apparatus from remote places. By using this function, managers or users manage or use an information processing apparatus from various nodes on a network more often than before.

Also, in recent years, portable information terminals such as cell phones and PDAs incorporating non-contact type IC chips have become popular. Information processing systems using these portable information terminals instead of ID cards for user authentication are also known. That is, the user can operate an information processing apparatus such as a copying machine by performing user authentication by only holding up a portable information terminal over the copying machine. This obviates the conventional cumbersome operation of entering a user ID and password from the operation panel of the copying machine, thereby further improving convenience.

Furthermore, many portable information terminals have a network connecting function, so a system in which the information processing apparatus described above is used or managed from a Web browser, dedicated application, or the like, operating on a portable information terminal is proposed. For example, Japanese Patent Laid-Open No. 10-240550 has disclosed a system in which a printer or the like is operated by using a portable information terminal.

Unfortunately, an information processing apparatus generally stores a large amount of secret information. To enable a remote operation across a network, therefore, it is necessary to limit access by determining whether to permit a remote operation by the user. For example, when conference materials are loaded into an information processing apparatus, it is desirable to allow only the attendees at the conference to perform operations such as browsing, printing out, and transmission of the conference materials. Conventionally, therefore, the user sets a password for all data of the conference materials, and notifies the attendees of the conference of the password. In this case, the user must specify conference materials and attendees for each conference and manage the correspondence of the conference materials to the attendees, resulting in a cumbersome operation. The user must also manage the attendees in order to specify them.

SUMMARY OF THE INVENTION

The present invention has been made to solve the above problem, and has as its object to provide a technique of suitably limiting access to stored information from an external apparatus which is not permitted to access the information.

According to an embodiment of the present invention, the foregoing object is attained by providing an information processing apparatus capable of communicating with an external apparatus, comprising an authentication unit adapted to authenticate an external apparatus, an input unit adapted to input information within a predetermined period, a storage unit adapted to store the information input by the input unit within the predetermined period in association with the external apparatus authenticated by the authentication unit, a receiving unit adapted to receive, from an external apparatus, a request for processing the information stored in the storage unit and an executing unit adapted to execute processing of the information stored in the storage unit, if the external apparatus having transmitted the request received by the receiving unit is the external apparatus associated with the information stored in the storage unit.

According to another embodiment of the present invention, the foregoing object is attained by providing an information processing apparatus capable of communicating with an external apparatus, comprising an acquisition unit adapted to acquire identification information from an external apparatus, an input unit adapted to input information within a predetermined period, a storage unit adapted to store the information input by the input unit within the predetermined period in association with the identification information acquired by the acquisition unit, a receiving unit adapted to receive, from an external apparatus, a request for processing the information stored in the storage unit and identification information and an executing unit adapted to execute processing of the information stored in the storage unit in accordance with the request, if the identification information associated with the information stored in the storage unit matches the identification information received by the receiving unit.

According to other embodiment of the present invention, the foregoing object is attained by providing an information processing method performed by an information processing apparatus, comprising the steps of, authenticating an external apparatus, inputting information to the information processing apparatus within a predetermined period, storing, in a storage device, the information input in the step of inputting within the predetermined period in association with the external apparatus authenticated in the step of authenticating, receiving, from an external apparatus, a request for processing the information stored in the storage device, and executing processing of the information stored in the storage device, if the external apparatus having transmitted the request received in the step of receiving is the external apparatus associated with the information stored in the storage device.

According to more other embodiment of the present invention, the foregoing object is attained by providing an information processing method performed by an information processing apparatus, comprising the steps of acquiring identification information from an external apparatus, inputting information within a predetermined period, storing, in a storage device, the information input in the step of inputting within the predetermined period in association with the identification information acquired in the step of acquiring, receiving, from an external apparatus, a request for processing the information stored in the storage device and identification information and executing processing of the information stored in the storage device in accordance with the request, if the identification information associated with the information stored in the storage device matches the identification information received in the step of receiving.

According to another one embodiment of the present invention, the foregoing object is attained by providing a program for causing an information processing apparatus to execute information processing, the program causing the information processing apparatus to execute an authentication procedure of authenticating an external apparatus, an input procedure of inputting information to the information processing apparatus within a predetermined period, a storage procedure of storing, in a storage device, the information input by the input procedure within the predetermined period in association with the external apparatus authenticated by the authentication procedure, a receiving procedure of receiving, from an external apparatus, a request for processing the information stored in the storage device and an executing procedure of causing the information processing apparatus to execute processing of the information stored in the storage device, if the external apparatus having transmitted the request received by the receiving procedure is the external apparatus associated with the information stored in the storage device.

According to an embodiment of the present invention, the foregoing object is attained by providing a program for causing an information processing apparatus to execute information processing, the program causing the information processing apparatus to execute an acquisition procedure of acquiring identification information from an external apparatus, an input procedure of inputting information within a predetermined period, a storage procedure of storing, in a storage device, the information input by the input procedure within the predetermined period in association with the identification information acquired by the acquisition procedure, a receiving procedure of receiving, from an external apparatus, a request for processing the information stored in the storage device and identification information and an executing procedure of executing processing of the information stored in the storage device in accordance with the request, if the identification information associated with the information stored in the storage device matches the identification information received by the receiving procedure.

Further features of the present invention will become apparent from the following description of exemplary embodiments (with reference to the attached drawings).

BRIEF DESCRIPTION OF THE DRAWINGS

FIG. 6 is a view showing an example of a window displayed on an operation panel when the information processing apparatus 110 is not in use;

FIG. 12 is a view showing an example of a window displayed on a portable information terminal when a manipulation request is rejected;

DESCRIPTION OF THE EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
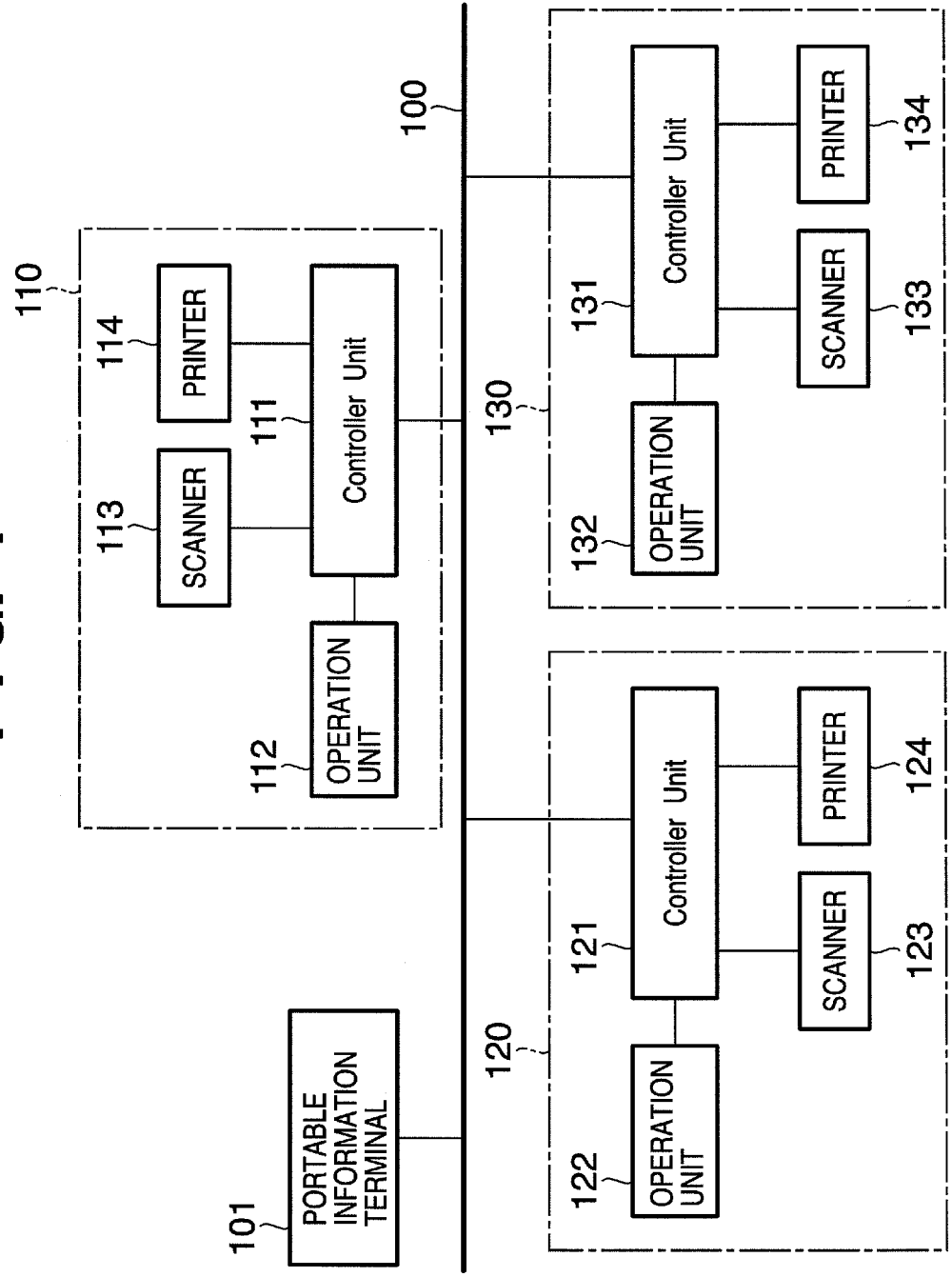
FIG. 1 is a block diagram showing the overall configuration of an image processing system according to an embodiment of the present invention.

FIG. 1 is a block diagram showing the overall configuration of an image processing system according to an embodiment of the present invention. Referring to FIG. 1, this image processing system comprises information processing apparatuses 110, 120, and 130 and a portable information terminal 101 connected across a network 100. The network 100 is a LAN (Local Area Network) or the like.

The information processing apparatus 110 includes a scanner 113 as an image input device, a printer 114 as an image output device, a controller unit 111, and an operation unit 112 as a user interface. The scanner 113, printer 114, and operation unit 112 are connected to the controller unit 111, and controlled by instructions from the controller unit 111. The controller unit 111 is connected to the LAN 100.

The information processing apparatuses 120 and 130 have the same arrangement as the information processing apparatus 110. The information processing apparatus 120 includes a scanner 123, printer 124, and operation unit 122 connected to a controller unit 121. The information processing apparatus 130 includes a scanner 133, printer 134, and operation unit 132 connected to a controller unit 131.

The portable information terminal 101 is a cell phone or PDA (Personal Digital Assistance), and is an information processing apparatus used by a user. The portable information terminal 101 comprises a controller unit and operation unit. Note that in FIG. 1, the portable information terminal 101 is directly connected to the LAN 100 similarly to the information processing apparatus 110 and the like. However, the portable information terminal 101 may also be connected wirelessly or across the Internet.

Figure 2:
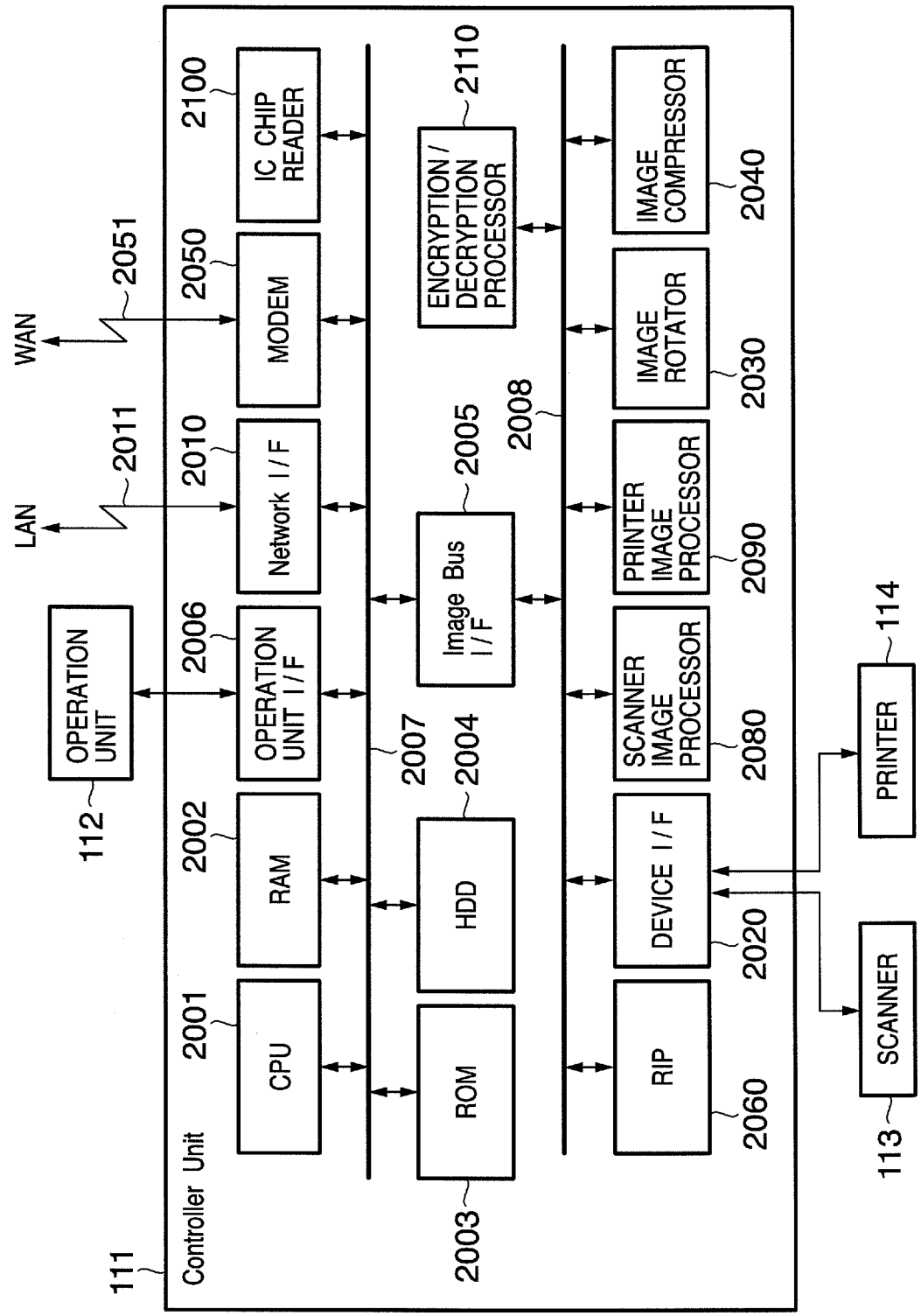
FIG. 2 is a block diagram showing the hardware configuration of information processing apparatuses 110, 120, and 130 shown in FIG. 1.

FIG. 2 is a block diagram showing the hardware configuration of the information processing apparatuses 110, 120, and 130 shown in FIG. 1. The controller unit 111 connects to the scanner 113 as an image input device and the printer 114 as an image output device. Also, the controller unit 111 inputs and outputs image information and device information by connecting to a LAN 2011 and public line (WAN) 2051.

In the controller unit 111, a CPU 2001 is a controller which controls the whole system. A RAM 2002 is a system work memory for the operation of the CPU 2001, and is an image memory for temporarily storing image data.

A ROM 2003 is a boot ROM and stores the boot program of the system. An HDD 2004 is a hard disk drive and stores system software and image data. An operation unit I/F 2006 is an interface with the operation unit (UI) 112 having a touch panel, and outputs, to the operation unit 112, image data to be displayed on the operation unit 112. The operation unit I/F 2006 also transmits information input from the operation unit 112 by the user of this system to the CPU 2001.

A network I/F 2010 connects to the LAN 2011 and inputs and outputs information. A modem 2050 connects to the public line 2051 and inputs and outputs information. These devices described above are arranged on a system bus 2007.

An image bus I/F 2005 is a bus bridge which connects the system bus 2007 and an image bus 2008 which transfers image data at high speed, and converts a data structure. The image bus 2008 is a PCI bus or IEEE1394. The following devices are arranged on the image bus 2008.

A raster image processor (RIP) 2060 rasterizes a PDL code into an bitmap image. A device I/F 2020 connects the scanner 113 and printer 114 as image input and output devices to the controller unit 111, and performs synchronous/asynchronous conversion of image data. A scanner image processor 2080 corrects, processes, and edits input image data. A printer image processor 2090 performs printer correction, resolution conversion, and the like on print-out image data.

An image rotator 2030 rotates image data. An image compressor 2040 performs JPEG compression/decompression on multilevel image data, and JBIG, MMR, or MH compression/decompression on binary image data. An IC chip reader 2100 has a function of reading information from and writing information in a non-contact type IC chip, and is used to authenticate a portable information terminal incorporating an IC chip.

An encryption/decryption processor 2110 is a hardware accelerator board which performs a data encryption/decryption process by using the key of the IC chip reader 2100.

Figure 3:
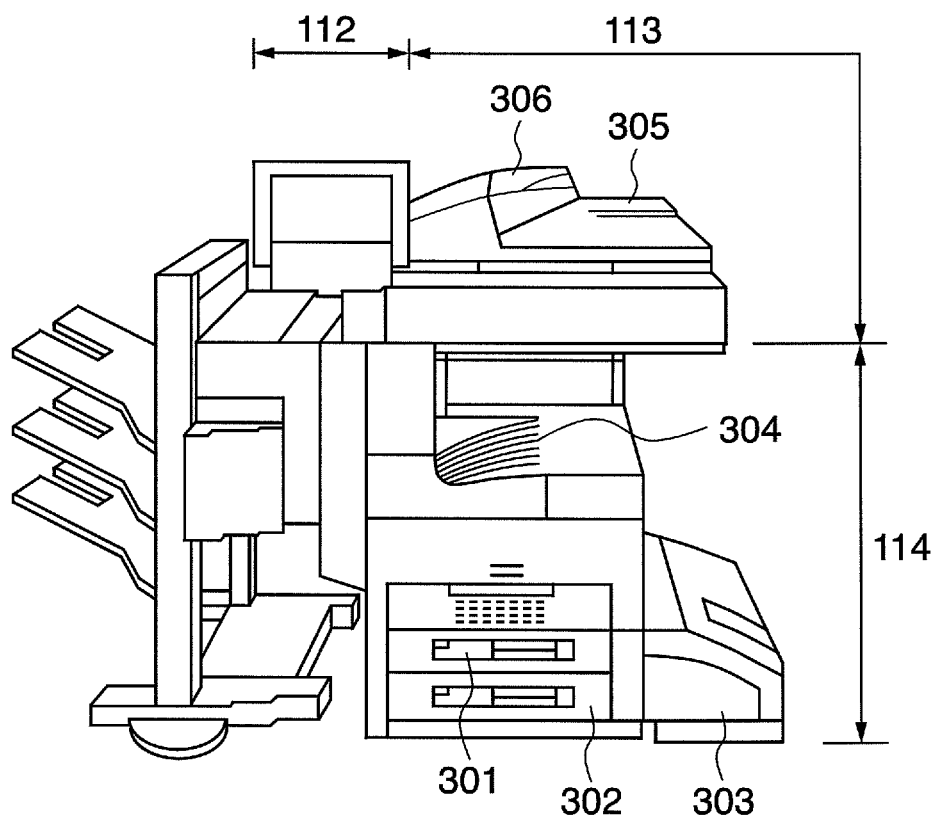
FIG. 3 is a perspective view showing the external appearance of the information processing apparatus 110.

FIG. 3 is a perspective view showing the outer appearance of the information processing apparatus 110. The information processing apparatuses 120 and 130 also have the same outer appearance. Although the information processing apparatus 110 will be explained below, the information processing apparatuses 120 and 130 have exactly the same arrangement and perform exactly the same operation as the information processing apparatus 110.

The scanner 113 as an image input device illuminates an image on a sheet of paper as an original, and generates raster image data by scanning a CCD line sensor (not shown).

The user sets originals on a tray 306 of a document feeder 305, and instructs the activation of scan on the operation unit 112. Consequently, the CPU 2001 of the controller unit 111 gives an instruction to the scanner 113, thereby feeding the originals set on the tray 306 one by one, and scanning the original images by the scanner 113.

The printer 114 as an image output device is a unit which prints the raster image data on a sheet. The printing method can be any of an electrophotographic method using a photosensitive drum or photosensitive belt, an ink-jet method which directly prints an image on a sheet by discharging ink from a micro-nozzle array, and the like. Note that the printing operation is activated by an instruction from the CPU 2001.

The printer 114 has a plurality of paper feed stages so that different sheet sizes or different sheet directions can be selected, and has corresponding sheet cassettes 301, 302, and 303. A sheet discharge tray 304 receives printed sheets.

Figure 4:
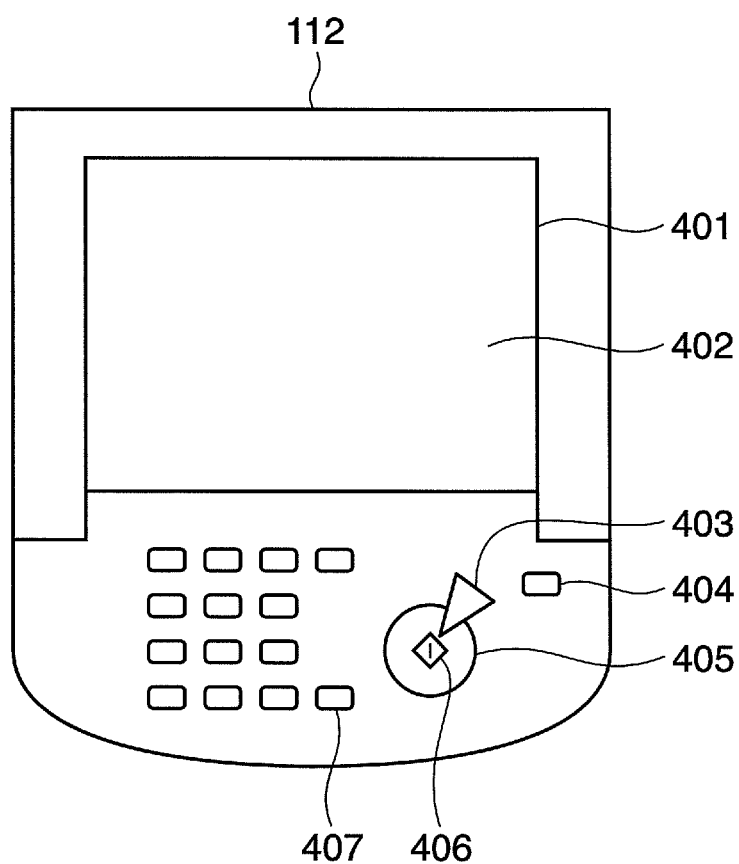
FIG. 4 is a plan view showing the arrangement of an operation unit 112 of the information processing apparatus 110.

FIG. 4 is a plan view showing the arrangement of the operation unit 112 of the information processing apparatus 110. Note that the operation units of the information processing apparatuses 120 and 130 have the same arrangement.

An LCD unit 401 has a structure in which a touch panel 402 is adhered on an LCD (Liquid Crystal Display). The LCD unit 401 displays operation windows and software keys of the information processing apparatus 110. When a displayed key is touched, the LCD unit 401 transmits position information indicating the touched position to the CPU 2001 of the controller unit 111.

A start key 405 is a key which is operated to start an original image read operation or the like. The central portion of the start key 405 has a two-color LED indicator 406 which emits green light and red light. The two-color LED indicator 406 indicates whether the start key 405 is operable in accordance with the color. A stop key 403 is a key which is operated to stop the operation of the information processing apparatus 110 in operation. An ID key 407 is a key which is operated to enter the user ID of the user or to designate log-out by the user. A reset key 404 is a key which is operated to initialize the settings from the operation unit 112.

Figure 5:
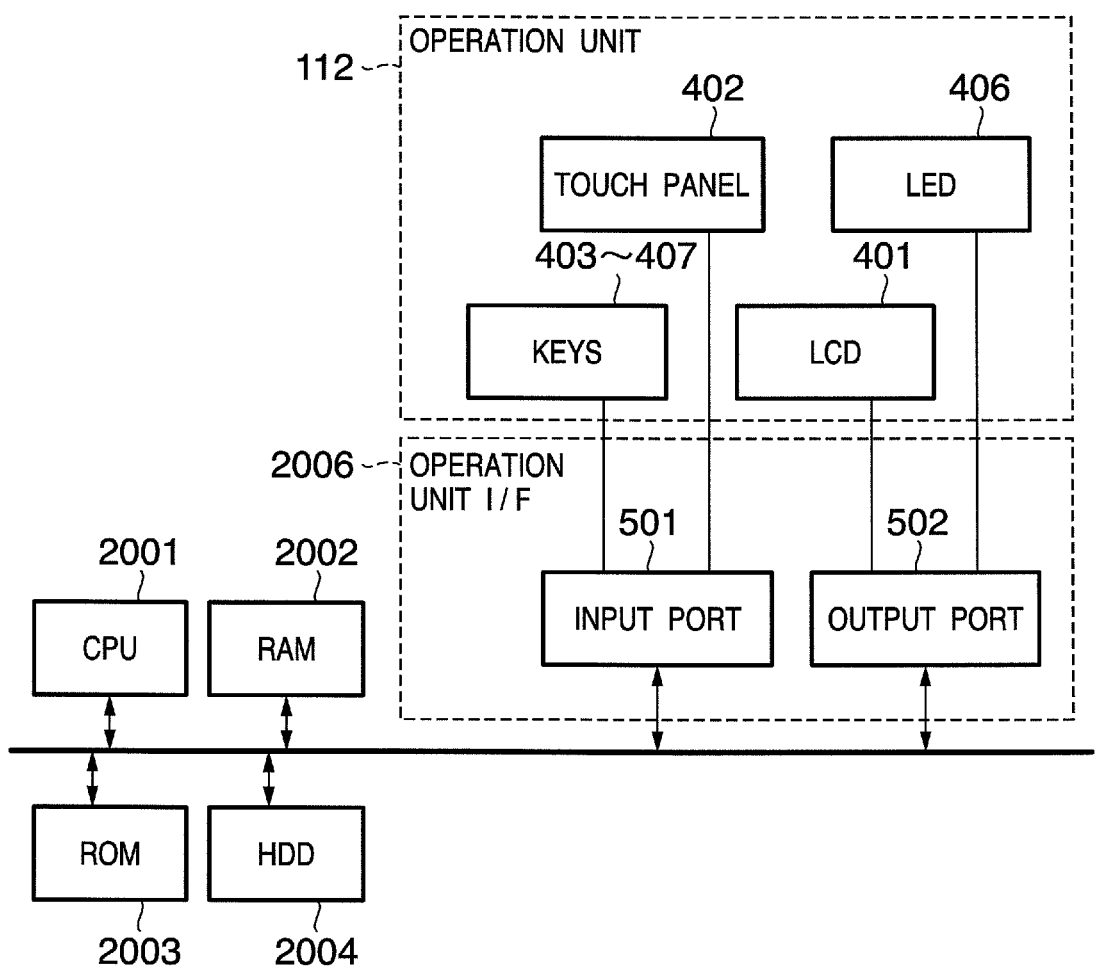
FIG. 5 is a block diagram showing the internal arrangements of the operation unit 112 and an operation unit I/F 2006 of the information processing apparatus 110 in relation to the internal arrangement of a control unit 111.

FIG. 5 is a block diagram showing the internal arrangements of the operation unit 112 and operation unit I/F 2006 of the information processing apparatus 110 in relation to the internal arrangement of the controller unit 111. Note that the information processing apparatus 110 will be explained below, but the information processing apparatus 120 or 130 has the same arrangement.

As described above, the operation unit 112 is connected to the system bus 2007 via the operation unit I/F 2006. The CPU 2001, RAM 2002, ROM 2003, and HDD 2004 are connected to the system bus 2007. The CPU 2001 comprehensively controls access to the various devices connected to the system bus 2007, on the basis of control programs and the like stored in the ROM 2003 and HDD 2004. The CPU 2001 also loads input information from the scanner 113 connected via the device I/F 2020, and outputs an image signal as output information to the printer 114 connected via the device I/F 2020. The RAM 2002 functions as a main memory, work area, and the like of the CPU 2001.

User input information from the touch panel 402 and the various hardware keys 403, 404, 405, and 407 is transferred to the CPU 2001 via an input port 501. The CPU 2001 generates display window data on the basis of the contents of the user input information and the control program, and outputs the display window data to the LCD unit 401 via an output port 502 which controls a window output device. The CPU 2001 also controls the two-color LED indicator 406 if necessary.

Figure 7:
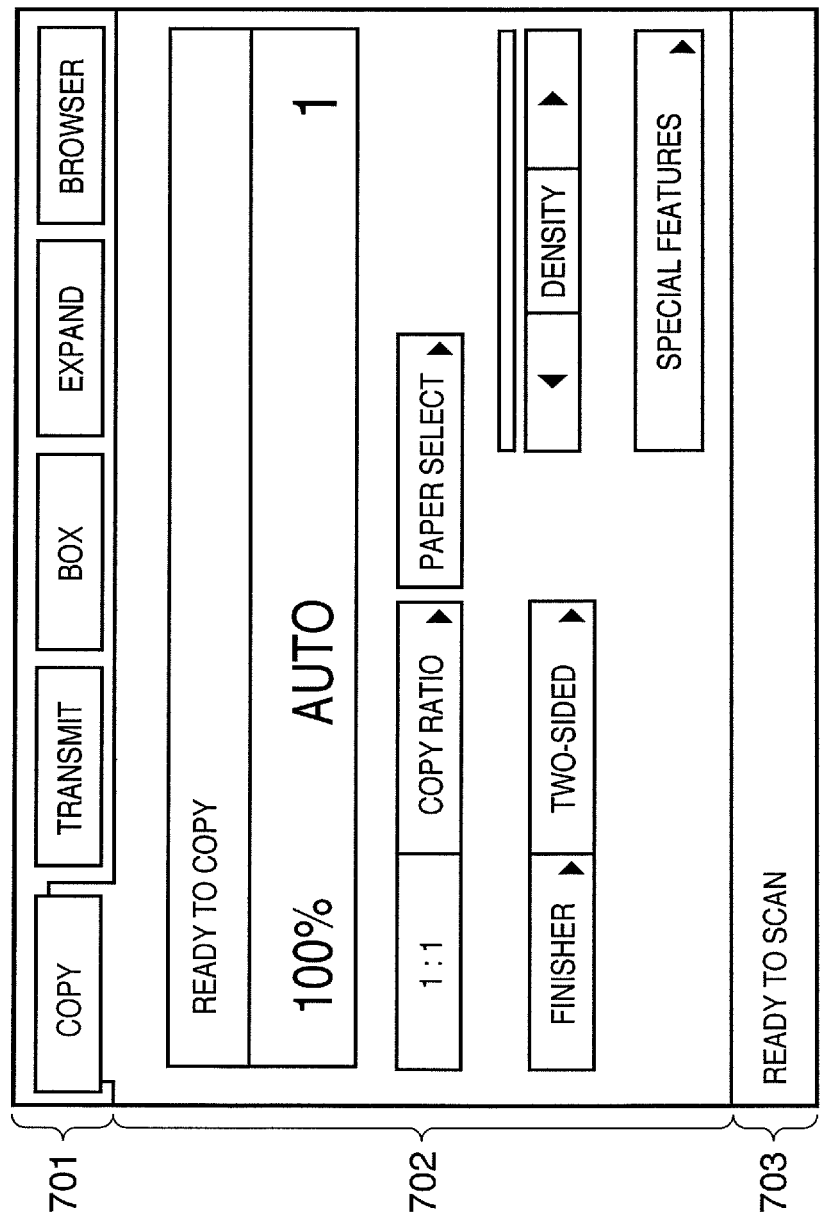
FIG. 7 is a view showing an example of a standard operation window displayed on the operation unit 112 of the information processing apparatus 110.

FIG. 7 is a view showing an example of a standard operation window displayed on the operation unit 112 of the information processing apparatus 110.

Buttons arranged in an uppermost portion 701 of FIG. 7 are used to select one of various functions provided by the information processing apparatus 110. A copy function is used to obtain a copy of an original by printing out, by the printer 114, original image data scanned by the scanner 113.

A transmission function is used to transmit original image data scanned by the scanner 113 or image data stored in the HDD 2004 to various output destinations. The output destinations are various output destinations to which data can be transmitted by various protocols via the network interface 2010, and various output destinations to which data can be transmitted by the protocol of a facsimile apparatus or the like via the modem 2050. The transmission function can transmit data by selecting a plurality of output destinations from these various output destinations.

A box function is used to browse, edit, print, and transmit document files such as image data and code data stored in the HDD 2004. The document files stored in the HDD 2004 include original image data scanned by the scanner 113, and data downloaded via the network interface 2010. The stored document files also include data obtained by storing print data received from other devices via the network interface 2010, facsimile data received from other devices via the modem 2050, and the like. The box function can also be used as an electronic mail box in the office environment of the user. In addition, the box function can be used as secured printing which increases the secrecy of a PDL print job by delaying print-out to a sheet until a password is entered.

An expansion function is used to call various expansion functions, e.g., a function of locking the scanner 113 so that it can be used from an external apparatus. A browser function is used to browse Web sites.

An intermediate portion 702 in FIG. 7 shows an operation window when the copy function is selected. A lowermost portion 703 in FIG. 7 is a status display area, and displays various messages such as the functions of the information processing apparatus 110 and information of the apparatus itself, regardless of the function selected in the uppermost portion 701.

Figure 8:
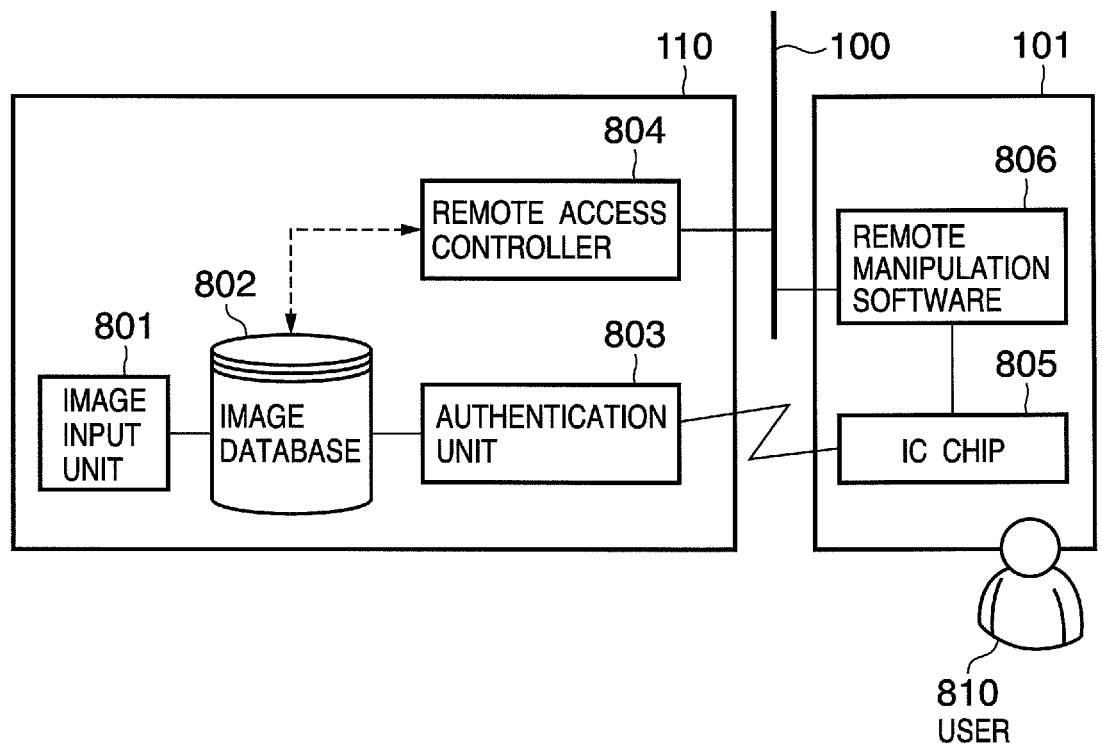
FIG. 8 is a block diagram showing a software structure for authentication by a portable information terminal 101 and for remote access from the portable information terminal 101.

FIG. 8 is a block diagram showing a software structure for performing authentication by the portable information terminal 101 and remote access from the portable information terminal 101. The information processing apparatus 110 has an image input unit 801, image database 802, authentication unit 803, and remote access controller 804. Also, the portable information terminal 101 of a user 810 has a non-contact type IC chip 805 in which authentication information is recorded, and remote operation software 806. In this embodiment, the information processing apparatus 110 and portable information terminal 101 are connected to the network 100, and can communicate with each other.

The image input unit 801 causes the scanner image processor 2080 to properly process image data of an image scanned by the scanner 113, and stores the processed data in the image database 802. The authentication unit 803 acquires identification information from the portable information terminal 101. The IC chip reader 2100 uses this identification information to perform data input/output and authentication with the non-contact type IC chip 805 in the portable information terminal 101, thereby identifying the portable information terminal 101. The authentication unit 803 stores the identification information of the authenticated portable information terminal in the image information database 802. The image database 802 stores, in the HDD 2004, the image data input from the image input unit and the identification information of the portable information terminal authenticated by the authentication unit 803 in association with each other. The remote access controller 804 accepts a manipulation request to image data in the image database from the portable information terminal across the network 100.

The IC chip 805 incorporated into the portable information terminal 101 is a non-contact type IC chip, and performs authentication with the authentication unit 803 of the information processing apparatus 110. The remote operation software 806 is used to operate the information processing apparatus across the network. The remote operation software 806 may be, e.g., a Web browser which communicates with the information processing apparatus by using HTTP across the network. The remote operation software 806 receives the identification information for identifying the portable information terminal 101 from the internal IC chip of the portable information terminal 101. When requesting an operation for the information processing apparatus 110, the remote operation software 806 transmits an operation request and the identification information to the information processing apparatus 110. For example, personal information for confirming the user is stored as authentication information in the IC chip. A portion of the personal information may also be used as the identification information of the portable information terminal.

An example of a system in which the information processing apparatus 110 as described above is installed in a conference room, and each participant at the conference has an apparatus (external apparatus) such as the portable information terminal 101, and which can easily control access from each participant at the conference to related materials will be described below.

Figure 9:
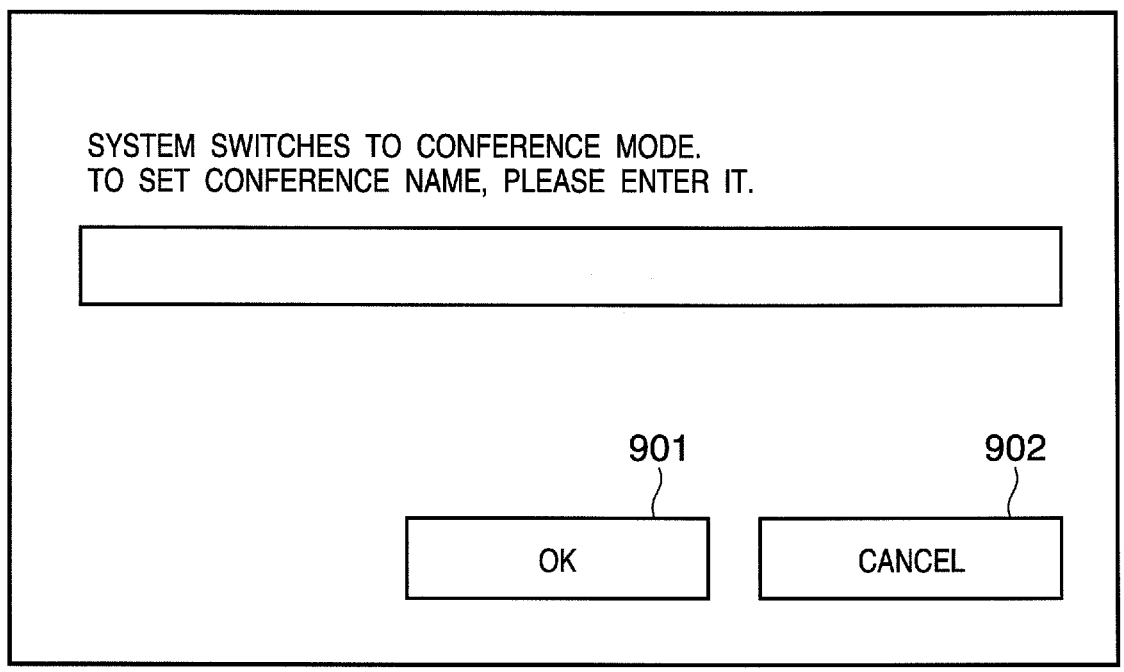
FIG. 9 is a view showing an example of a conference mode setting window displayed on the operation unit 112 of the information processing apparatus 110.

The information processing apparatus installed in the conference room has a conference mode for easily controlling access from each participant at the conference to related materials. FIG. 9 is a view showing an example of a conference mode setting window displayed on the operation unit 112 of the information processing apparatus 110. That is, this conference mode setting window shown in FIG. 9 is displayed when the user operates the operation unit 112. When the user inputs a conference name and touches an OK button 901, the conference mode is set. If the user touches a cancel button 902, the display returns to a normal window without switching to the conference mode.

When entering the conference room, each participant at the conference holds up the portable information terminal 101 over the information processing apparatus 110, thereby performing recognition by the built-in IC chip and registration of an attendance at the conference. The information processing apparatus 110 records the identification information of the recognized portable information terminal in the image database 802. When materials used in the conference are loaded by the image input unit 801 of the information processing apparatus 110, the loaded image data is registered in the image database 802. During the conference mode, the recognized portable information terminal and the loaded image data are stored in association with the conference. When the conference is over, the conference mode is terminated by an operation from the operation unit 112.

Figure 10:
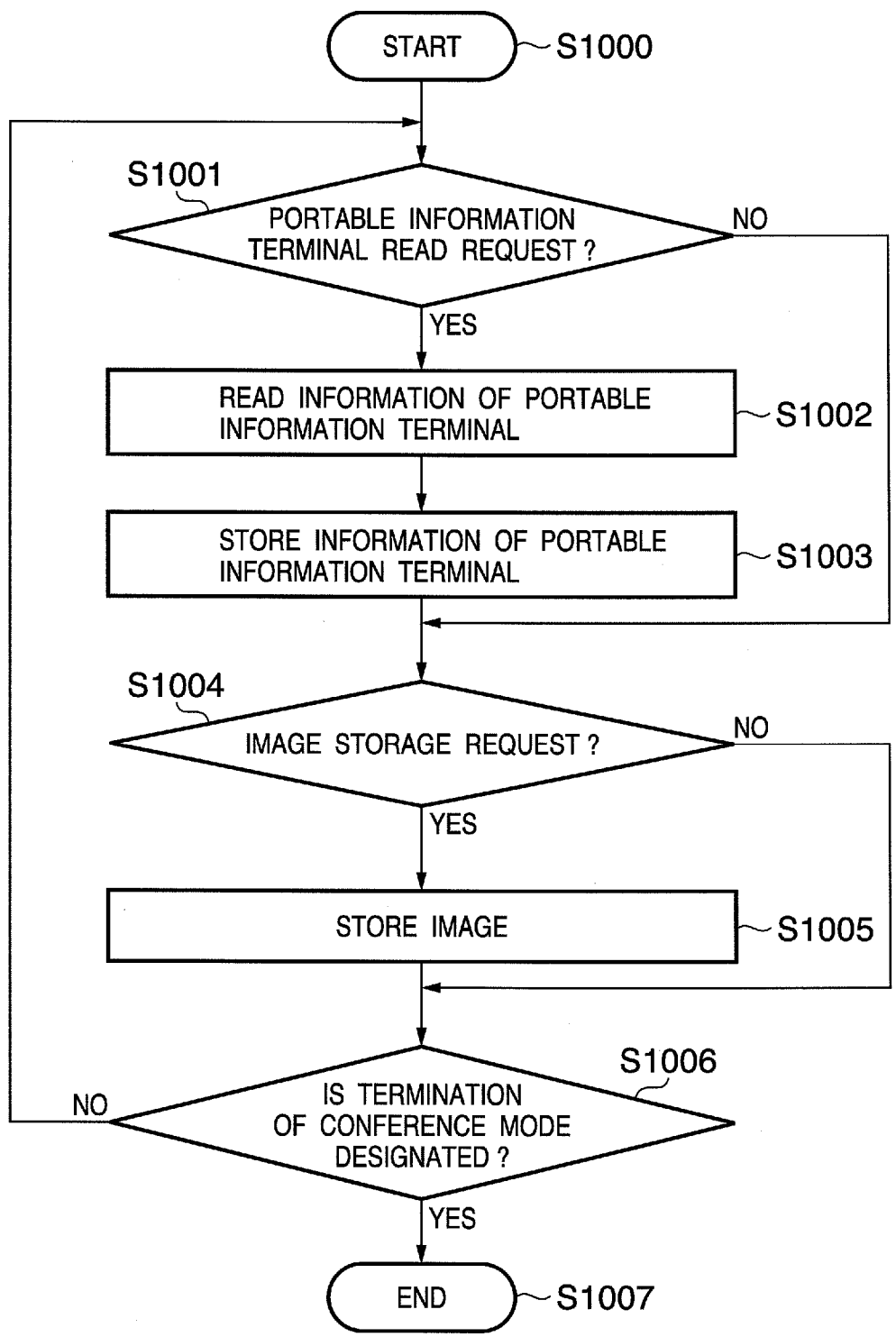
FIG. 10 is a flowchart for explaining the operation procedure of the information processing apparatus 110 in a conference mode.

FIG. 10 is a flowchart for explaining the operation procedure of the information processing apparatus 110 in the conference mode. As described above, the conference mode is started when the OK button 901 is touched in the conference mode setting window shown in FIG. 9 (step S1000).

First, the authentication unit 803 determines whether a portable information terminal read request is issued from the portable information terminal 101 (step S1001). The portable information terminal 101 issues a portable information terminal read request when the participant holds up the portable information terminal 101 over the information processing apparatus 110 and presses a predetermined button. If no portable information terminal read request is issued (NO), the information processing apparatus 110 advances to step S1004. If a portable information terminal read request is issued (YES), the authentication unit 803 performs authentication of the portable information terminal 101, thereby reading the identification information of the portable information terminal 101 (step S1002). The image database 802 stores, in the HDD 2004, that identification information of the portable information terminal 101, which is read by the authentication unit 803 (step S1003), and the information processing apparatus 110 advances to step S1004.

In step S1004, the image input unit 801 determines whether an image scan (image storage) request is issued. When the participant at the conference sets an original such as a conference material in the document feeder 305 and presses the start key 405, an image scan (image storage) request is issued. If the participant presses the start key 405 after designating the copy function in the operation window, copying is performed, and step S1005 described below is executed. If no image scan (image storage) request is issued (NO), the information processing apparatus 110 advances to step S1006. If an image scan (image storage) request is issued (YES), the image input unit 801 controls the scanner 113 to scan the image, and stores image data of the scanned image in the image database 802 (step S1005). The image database 802 stores, in the HDD 2004, the image data input in step S1005 in association with the identification information stored in step S1003 (step S1005). After that, the information processing apparatus 110 advances to step S1006.

In step S1006, the authentication unit 803 determines whether termination of the conference mode is designated. When the conference is over, the participant at the conference designates termination of the conference mode by operating the operation unit 112. If termination is designated (YES), the authentication unit 803 terminates the conference mode (step S1007). If no conference termination mode is designated (NO), the information processing apparatus 110 returns to step S1001.

Figure 11:
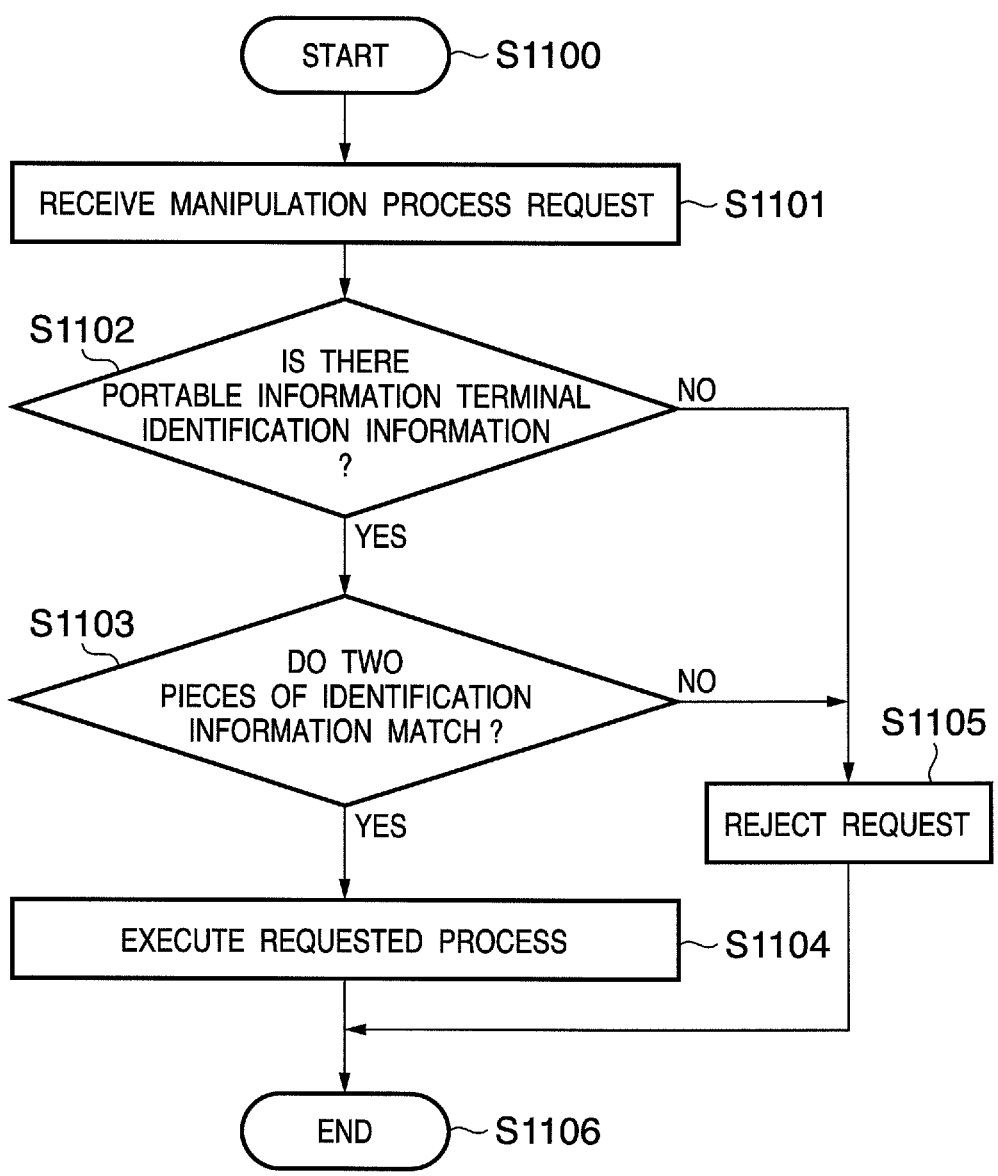
FIG. 11 is a flowchart for explaining the procedure of the information processing apparatus 110 when a remote manipulation process request is received.

FIG. 11 is a flowchart for explaining the procedure of the information processing apparatus 110 when a remote manipulation process request is received.

First, the remote access controller 804 receives a remote manipulation request across the network (step S1101). The remote access controller 804 then determines whether the identification information of the portable information terminal is added to the request (step S1102). If no identification information is added (NO), the information processing apparatus 110 advances to step S1105. If the identification information is added (YES), the remote access controller 804 determines whether image data for which the manipulation request is issued is stored in association with the identification information added to the manipulation request (step S1103).

If the identification information associated with the image data for which the manipulation request is issued matches the identification information added to the manipulation request (YES), the process requested by the manipulation request is executed (step S1104). The remote access controller 804 controls the information processing apparatus 110 to execute, e.g., data browsing, printing out, or transmission, as the process requested by the manipulation request (step S1104). In data browsing, the remote access controller 804 returns the requested image data. In printing out, the remote access controller 804 prints out an image based on the requested image data. In transmission, the remote access controller 804 transmits the requested image data to the designated transmission destination. On the other hand, if the identification information associated with the image data for which the manipulation request is issued does not match the identification information added to the manipulation request (NO), the information processing apparatus 110 advances to step S1105.

In step S1105, the remote access controller 804 rejects the manipulation request from the portable information terminal, and responds to the portable information terminal having transmitted the manipulation request to display a window indicating that the portable information terminal has no right to manipulate the data. FIG. 12 is a view showing an example of the window displayed on the portable information terminal when the manipulation request is rejected.

Figure 13:
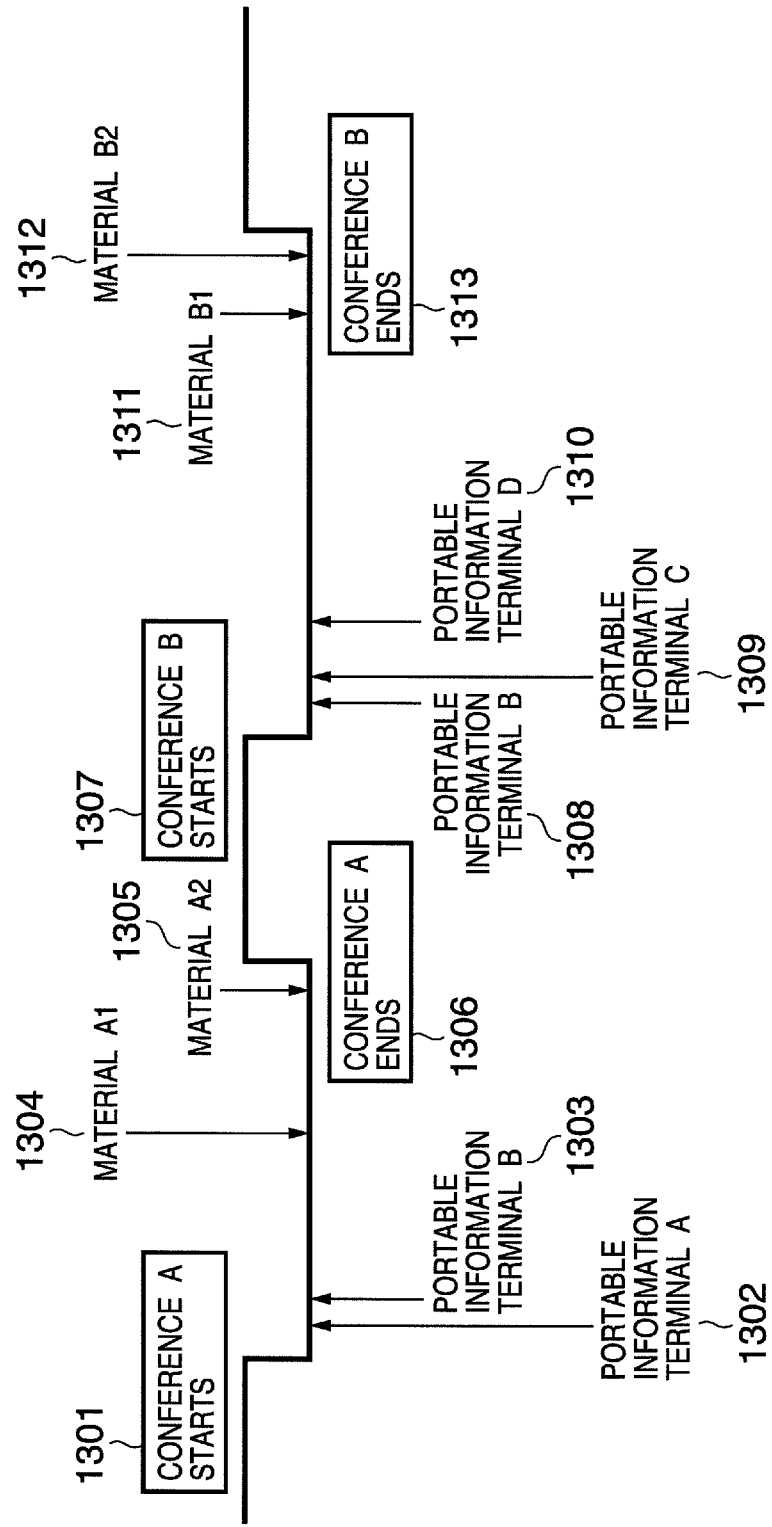
FIG. 13 is a view showing examples of operations performed on the information processing apparatus 110.
Figure 14:
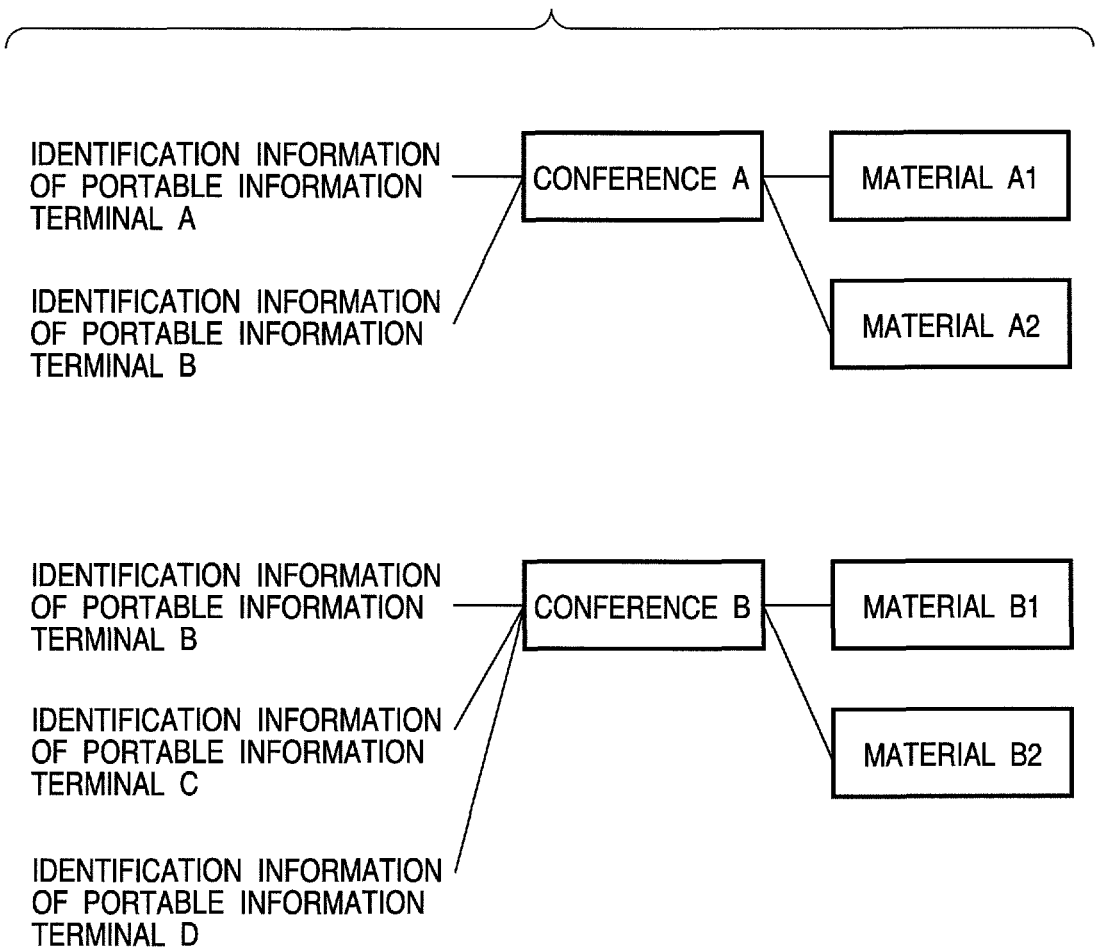
FIG. 14 is a view schematically showing the contents of an image database of the information processing apparatus 110 when the operations shown in FIG. 13 are performed.
Figure 15:
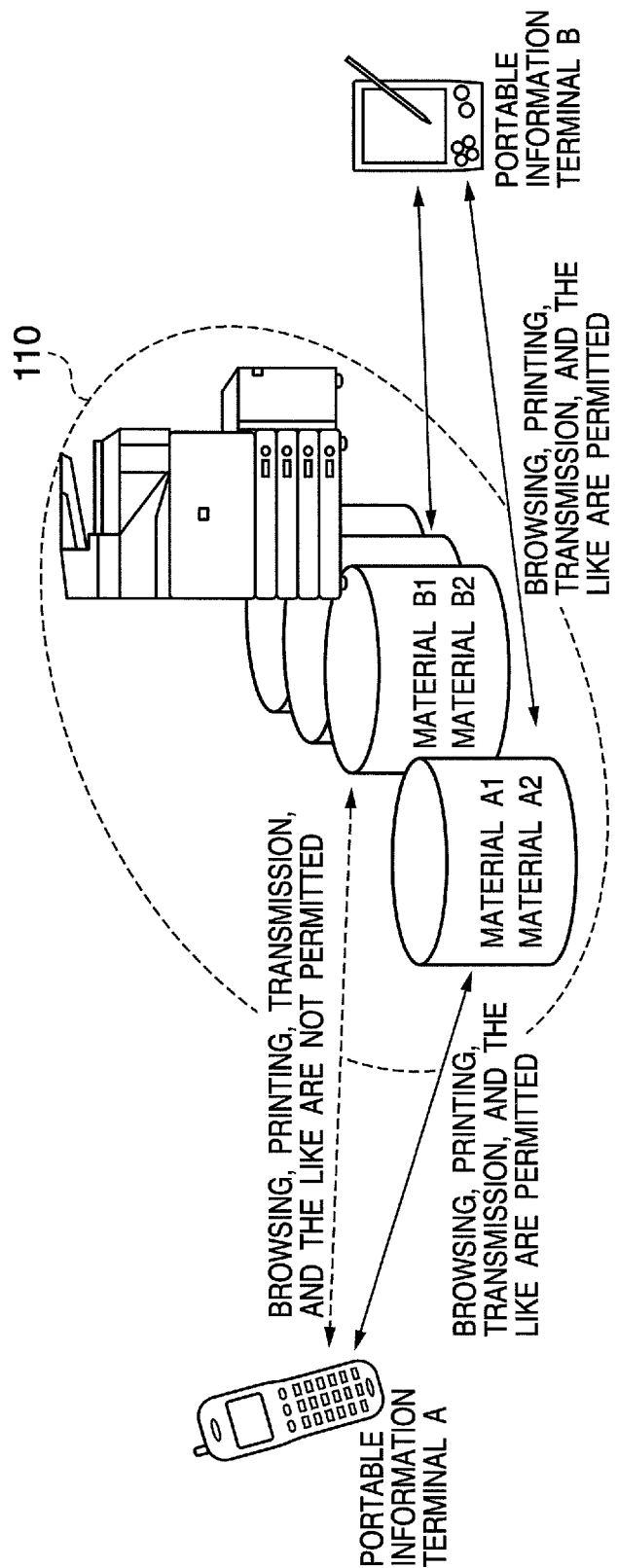
FIG. 15 is a view schematically showing the state in which a remote manipulation request is transmitted from the portable information terminal after the operations shown in FIG. 14 are performed.

FIGS. 13 to 15 illustrate an embodiment in which two conferences are held by using the image processing system according to this embodiment. FIG. 13 is a view showing an example of an operation performed on the image processing apparatus 110. Reference numeral 1301 in FIG. 13 indicates that the user has started conference A by setting the information processing apparatus 110 in the conference mode by the operation described earlier. Reference numeral 1302 indicates that participant A at the conference holds up portable information terminal A over the information processing apparatus 110 to perform authentication between portable information terminal A and the information processing apparatus 110. Reference numeral 1303 indicates that participant B at the conference holds up portable information terminal B over the information processing apparatus 110 to perform authentication between portable information terminal B and the information processing apparatus 110. Reference numerals 1304 and 1305 indicate that materials (distributed materials and the contents written on a board) related to the conference are loaded into the information processing apparatus 110 during the conference. Reference numeral 1306 indicates that the user has terminated the conference mode.

After that, the user sets the information processing apparatus 110 in the conference mode again in 1307 in order to hold another conference B, and authentication is performed between portable information terminals B, C, and D and the information processing apparatus 110 in 1308, 1309, and 1310, respectively. Materials related to the conference are loaded into the information processing apparatus 110 in 1311 and 1312, and the user terminates the conference mode in 1313.

FIG. 14 is a view schematically showing the contents of the image database 802 after conference B is over. In this state, the image database 802 stores the identification information of portable information terminal A, the identification information of portable information terminal B, image data of material A1, and image data of material A2 in association with conference A. The image database 802 also stores the identification information of portable information terminal B, the identification information of portable information terminal C, the identification information of portable information terminal D, image data of material B1, and image data of material B2 in association with conference B.

Processing when portable information terminals A and B access the information processing apparatus 110 from remote places across the network after that is as follows. FIG. 15 is a view schematically showing a case in which portable information terminals transmit manipulation requests to the information processing apparatus 110 while the image database 802 is in the state shown in FIG. 4. That is, as shown in FIG. 15, portable information terminal A can access to browse, print, or transmit the materials of conference A, but cannot access the materials of conference B. On the other hand, portable information terminal B can access both the materials of conferences A and B.

As described above, in the image processing system including the information processing apparatus and portable information terminal according to this embodiment, it is readily possible to allow only the attendants at a conference to browse or manipulate materials related to the conference from remote places.

Processing when the system is not used in the conference mode will be explained below. The user starts using the information processing apparatus 110 by performing authentication by holding up the portable information terminal 101 over the information processing apparatus 110, and stops using the information processing apparatus 110 by performing a log-out process by pressing the ID key 407 of the operation unit 112. In this case, the period from the authentication process using the portable information terminal 101 to the log-out process using the ID key 407 is regarded as one session, and image data loaded during the session is stored in association with the portable information terminal 101 used in authentication of the session. After that, the user accesses the information processing apparatus 110 by using the portable information terminal 101 from a remote place across the network, in order to request processing for the images stored in the information processing apparatus 110. In this case, access to image data associated with the portable information terminal 101 is permitted, and access to other image data is rejected.

While the information processing apparatus 110 is not in use, a window as shown in FIG. 6 is displayed on the operation panel of the information processing apparatus 110. FIG. 6 is a view showing an example of the window displayed on the operation panel while the information processing apparatus 110 is not in use. When the user performs authentication by using his or her portable information terminal 101, a normal window as shown in FIG. 7 is displayed on the operation panel. When the user performs an image loading process, the internal image database of the information processing apparatus 110 stores the loaded image data in association with the portable information terminal 101 used in the authentication. All image data loaded by the user is similarly processed until the user performs a log-out process. When the user performs a log-out process, the window shown in FIG. 6 is displayed on the operation panel again, and the next user's processing is waited for.

Figure 16:
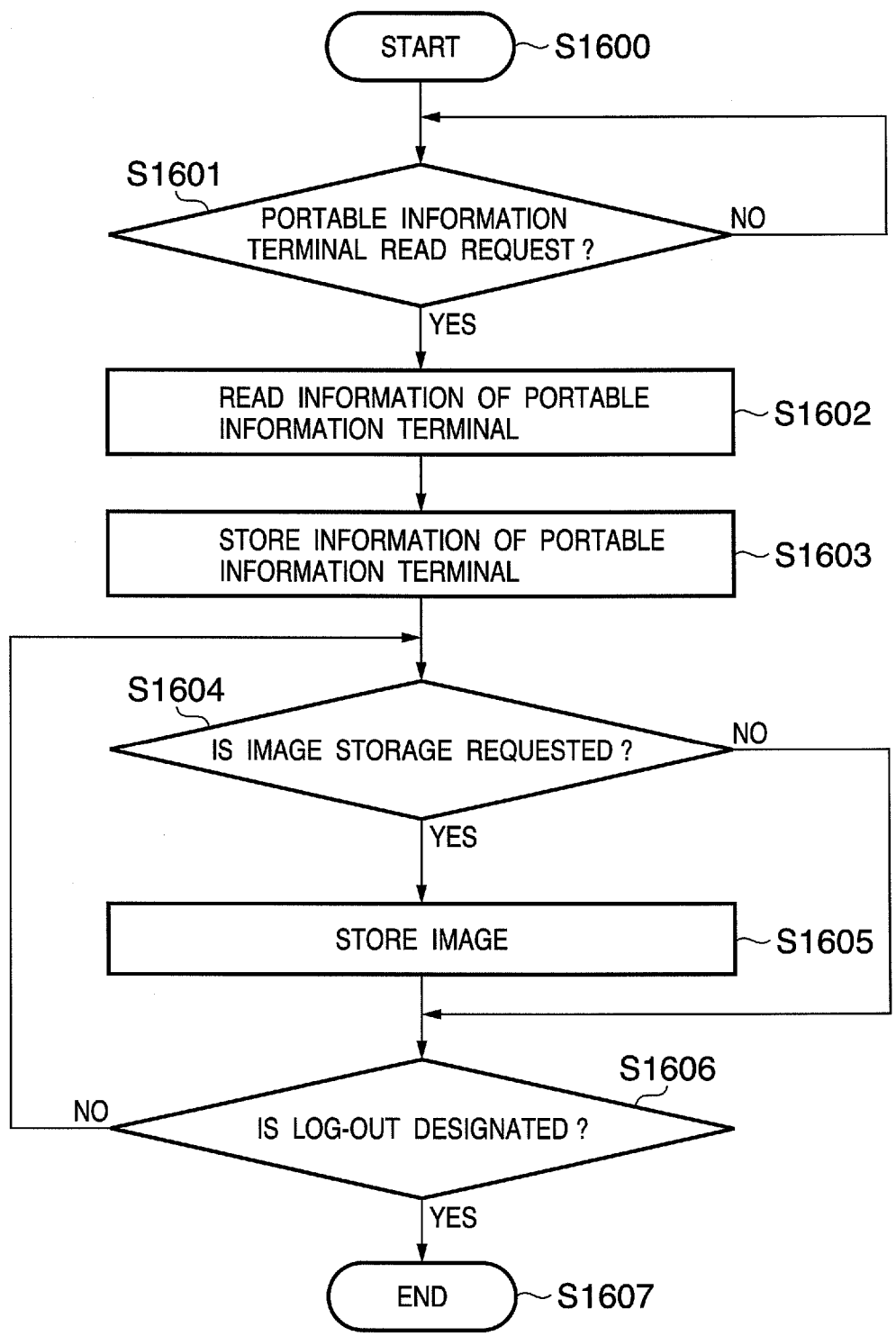
FIG. 16 is a flowchart for explaining the operation procedure of the information processing apparatus 110 in a mode other than the conference mode.

FIG. 16 is a flowchart for explaining the operation procedure of the information processing apparatus 110 in this case.

First, the authentication unit 803 determines whether a portable information terminal read request is issued from the portable information terminal 101 (step S1601). The portable information terminal issues a portable information terminal read request when the user holds up the portable information terminal 101 over the information processing apparatus 110 and presses a predetermined button. If no portable information terminal read request is issued (NO), the information processing apparatus 110 returns to step S1601. If a portable information terminal read request is issued (YES), the authentication unit 803 performs authentication of the portable information terminal 101, thereby reading the identification information of the portable information terminal 101 (step S1602). The image database 802 stores, in the HDD 2004, that identification information of the portable information terminal 101, which is read by the authentication unit 803 (step S1603), and the information processing apparatus 110 advances to step S1604.

In step S1604, the image input unit 801 determines whether an image scan (image storage) request is issued. When the log-in user sets an original sheet in the document feeder 305 and presses the start key 405, an image scan (image storage) request is issued. If the user presses the start key 405 after designating the copy function in the operation window, copying is performed, and step S1605 described below is executed. If no image scan (image storage) request is issued (NO), the processing of the information processing apparatus 110 advances to step S1606. If an image scan (image storage) request is issued (YES), the image input unit 801 controls the scanner 113 to scan the image, and stores image data of the scanned image in the image database 802 (step S1605). The image database 802 stores, in the HDD 2004, the image data input in step S1605 in association with the identification information stored in step S1603 (step S1605). After that, the information processing apparatus 110 advances to step S1606.

In step S1606, the authentication unit 803 determines whether log-out is designated. When finishing using the information processing apparatus 110, the user designates log-out by operating the operation unit 112. If log-out is designated (YES), the authentication unit 803 terminates the user's session (step S1607). If no log-out is designated (NO), the processing of the information processing apparatus 110 returns to step S1604.

The procedure of the information processing apparatus 110 when a remote manipulation process request is received from the portable information terminal after that is the same as shown in FIG. 11. Accordingly, the user of the portable information terminal can access image data loaded after the portable information terminal is authenticated, but cannot access any data loaded by other users.

In this embodiment as described above, when a user accesses loaded image data from a remote place, access control can be easily performed so as not to accept requests from external apparatuses except for a portable information terminal used in authentication. That is, it is possible to suitably limit access to stored information from an external apparatus which is not permitted to access the information.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-228473 filed on Aug. 5, 2005, which is hereby incorporated by reference herein in its entirety.

What is claimed is:

1. An information processing apparatus capable of communicating with an external apparatus, comprising:
   an authentication unit configured to authenticate an external apparatus;
   an input unit configured to input data;
   an instruction unit configured to receive from a user an instruction for instructing a start of a particular period, wherein if the input unit inputs data within the particular period and the authentication unit authenticates a plurality of external apparatuses within the particular period, the data input by the input unit is to be automatically associated with the plurality of external apparatuses authenticated by the authentication unit;
   a storage unit configured to store data input by the input unit within the particular period in association with a plurality of external apparatuses authenticated by the authentication unit within the particular period;
   a storage control unit configured to, if the input unit inputs data within the particular period and the authentication unit authenticates a plurality of external apparatuses within the particular period, automatically associate the data with the plurality of external apparatuses and store, in the storage unit, the data being associated with the plurality of external apparatuses;
   a receiving unit configured to receive, from an external apparatus, a request for processing the data stored in the storage unit; and
   an executing unit configured to, if the external apparatus from which the request is received by the receiving unit is any one of the plurality of external apparatuses with which the data stored in the storage unit is associated, execute processing of the data stored in the storage unit, in accordance with the request received by the receiving unit.

2. The apparatus according to claim 1, further comprising a rejecting unit configured to reject the request for processing the data stored in the storage unit, if the external apparatus from which the request is received by the receiving unit is not any one of the plurality of external apparatuses with which the data stored in the storage unit is associated.

3. The apparatus according to claim 1, wherein
   the external apparatus is a portable information terminal incorporating a non-contact type IC chip in which identification information and authentication information are recorded, and
   the authentication unit comprises an IC chip reader which reads the identification information recorded in the IC chip, and reads the authentication information recorded in the IC chip of the portable information terminal.

4. The apparatus according to claim 1, wherein
   the instruction unit further configured to receive from the user an instruction for instructing an end of the particular period.

5. The apparatus according to claim 1, further comprising a communication unit configured to perform HTTP communication with an external apparatus including a Web browser function across a network.

6. An information processing apparatus capable of communicating with an external apparatus, comprising:
   an acquisition unit configured to acquire identification information from an external apparatus;
   an input unit configured to input data;
   an instruction unit configured to receive from a user an instruction for instructing a start of a particular period, wherein if the input unit inputs data within the particular period and the acquisition unit acquires a plurality of pieces of identification information within the particular period, the data input by the input unit is to be automatically associated with the plurality of pieces of identification information acquired by the acquisition unit;
   a storage unit configured to store data input by the input unit within the particular period in association with a plurality of pieces of identification information acquired by the acquisition unit from a plurality of external apparatuses within the particular period;
   a storage control unit configured to, if the input unit inputs data within the particular period and the acquisition unit acquires a plurality of pieces of identification information within the particular period, automatically associate the data with the plurality of pieces of identification information and store, in the storage unit, the data being associated with the plurality of pieces of identification information;
   a receiving unit configured to receive, from an external apparatus, a request for processing the data stored in the storage unit, and identification information; and
   an executing unit configured to, if the identification information received by the receiving unit is any one of the plurality of pieces of identification information with which the data stored in the storage unit is associated, execute processing of the data stored in the storage unit, in accordance with the request received by the receiving unit.

7. The apparatus according to claim 6, wherein the instruction unit further configured to receive from the user an instruction for instructing an end of the particular period.

8. The apparatus according to claim 6, wherein the identification information includes identification information for identifying the external apparatus or a user of the external apparatus.

9. An information processing method performed by an information processing apparatus, comprising the steps of:

receiving an instruction for instructing a start of a particular period, wherein if data is input to the information processing apparatus within the particular period and a plurality of external apparatuses are authenticated within the particular period, the data is to be automatically associated with the plurality of external apparatuses;

authenticating a plurality of external apparatuses within the particular period;

inputting data to the information processing apparatus within the particular period;

automatically associating the data input in the step of inputting within the particular period with the plurality of external apparatuses authenticated in the step of authenticating within the particular period;

storing, in a storage device, the data input in the step of inputting within the particular period in association with the plurality of external apparatuses authenticated in the step of authenticating within the particular period;

receiving, from an external apparatus, a request for processing the data stored in the storage device; and executing, if the external apparatus from which the request is received in the step of receiving is any one of the plurality of external apparatuses with which the data stored in the storage device is associated, processing of the data stored in the storage device, in accordance with the request received in the step of receiving.

10. An information processing method performed by an information processing apparatus, comprising the steps of:

receiving an instruction for instructing a start of a particular period, wherein if data is input to the information processing apparatus within the particular period and a plurality of pieces of identification information acquired from a plurality of external apparatuses within the particular period, the data is to be automatically associated with the plurality of pieces of identification information;

acquiring a plurality of pieces of identification information from a plurality of external apparatuses within the particular period;

inputting data within the particular period;

automatically associating the data input in the step of inputting within the particular period with the plurality of pieces of identification information acquired in the step of acquiring within the particular period;

storing, in a storage device, the data input in the step of inputting within the particular period in association with the plurality of pieces of identification information acquired in the step of acquiring from the plurality of external apparatuses within the period;

receiving, from an external apparatus, a request for processing the data stored in the storage device, and identification information; and executing, if the identification information received in the step of receiving is any one of the plurality of pieces of identification information with which the data stored in the storage device is associated, processing of the data stored in the storage device, in accordance with the request received in the step of receiving.

11. A non-transitory computer-readable medium storing a computer program for causing an information processing apparatus to execute information processing, the program causing the information processing apparatus to execute:

an instruction procedure of receiving from a user an instruction for instructing a start of a particular period, wherein if data is input to the information processing apparatus within the particular period and a plurality of external apparatuses are authenticated within the particular period, the data is to be automatically associated with the plurality of external apparatuses;

an authentication procedure of authenticating a plurality of external apparatuses within the particular period;

an input procedure of inputting data to the information processing apparatus within the particular period;

an associating procedure of automatically associating the data input by the input procedure within the particular period with the plurality of external apparatuses authenticated by the authentication procedure within the particular period;

a storage procedure of storing, in a storage device, the data input by the input procedure within the particular period in association with the plurality of external apparatuses authenticated by the authenticating procedure within the particular period;

a receiving procedure of receiving, from an external apparatus, a request for processing the data stored in the storage device; and an executing procedure of causing the information processing apparatus to execute, if the external apparatus from which the request is received by the receiving procedure is any one of the plurality of external apparatuses with which the data stored in the storage device is associated, processing of the data stored in the storage device, in accordance with the request received by the receiving procedure.

12. A non-transitory computer-readable medium storing a computer program for causing an information processing apparatus to execute information processing, the program causing the information processing apparatus to execute:

an instruction procedure of receiving from a user an instruction for instructing a start of a particular period, wherein if data is input to the information processing apparatus within the particular period and a plurality of pieces of identification information acquired from a plurality of external apparatuses within the particular period, the data is to be automatically associated with the plurality of pieces of identification information;

an acquisition procedure of acquiring a plurality of pieces of identification information from a plurality of external apparatuses within the particular period;

an input procedure of inputting data to the information processing apparatus within the particular period;

an associating procedure of automatically associating the data input by the input procedure within the particular period with the plurality of pieces of identification information acquired by the acquisition procedure within the particular period;

a storage procedure of storing, in a storage device, the data input by the input procedure within the particular period in association with the plurality of pieces of identification information acquired by the acquisition procedure from the plurality of external apparatuses within the particular period;

a receiving procedure of receiving, from an external apparatus, a request for processing the data stored in the storage device and identification information; and an executing procedure of executing, if the identification information received by the receiving procedure is any one of the plurality of pieces of identification information with which the data stored in the storage device is associated, processing of the data stored in the storage device, in accordance with the request received by the receiving procedure.

* * * * *